(12) United States Patent
Tingley

(10) Patent No.: US 9,332,766 B2
(45) Date of Patent: May 10, 2016

(54) INDUSTRIAL BAGUETTE TRAY

(71) Applicant: Jason Tingley, Beavercreek, OH (US)

(72) Inventor: Jason Tingley, Beavercreek, OH (US)

(73) Assignee: American Pan Company, Urbana, OH (US)

(*) Notice: Subject to any disclaimer, the term of this patent is extended or adjusted under 35 U.S.C. 154(b) by 0 days.

(21) Appl. No.: 13/911,737

(22) Filed: Jun. 6, 2013

(65) Prior Publication Data

US 2014/0361021 A1 Dec. 11, 2014

(51) Int. Cl.
*A47J 37/01* (2006.01)
*A21B 3/13* (2006.01)
*A47J 27/12* (2006.01)

(52) U.S. Cl.
CPC ............... *A21B 3/132* (2013.01); *A21B 3/133* (2013.01); *A21B 3/139* (2013.01)

(58) Field of Classification Search
CPC .......... A21B 3/13; A21B 3/132; A21B 3/133; A21B 3/134; A21B 3/139; A47J 37/01; B65D 21/0206; B65D 1/30
USPC ............ 220/573.2, 573.5, 573.4, 23.4, 573.1, 220/23.2
See application file for complete search history.

(56) References Cited

U.S. PATENT DOCUMENTS

| 1,302,661 | A | * | 5/1919 | Jackson | 220/23.2 |
| 1,521,289 | A | * | 12/1924 | Guttman | 220/23.4 |
| 2,215,113 | A | * | 9/1940 | Vogel | 220/23.4 |
| 2,305,014 | A | * | 12/1942 | Langel | 220/23.6 |
| 2,407,021 | A | * | 9/1946 | Langel | 220/23.4 |
| 3,572,537 | A | * | 3/1971 | Baltzer | 220/23.4 |
| 5,232,609 | A | * | 8/1993 | Badinier et al. | 249/102 |
| D701,418 | S | * | 3/2014 | Tingley | D7/357 |
| 2003/0047838 | A1 | * | 3/2003 | Beale et al. | 264/328.1 |
| 2005/0204932 | A1 | * | 9/2005 | Tingley | 99/445 |
| 2012/0118174 | A1 | * | 5/2012 | Ji | 99/441 |

* cited by examiner

*Primary Examiner* — J Gregory Pickett
*Assistant Examiner* — Niki M Eloshway
(74) *Attorney, Agent, or Firm* — McNees Wallace & Nurick, LLC

(57) ABSTRACT

A baking tray that includes a frame having a plurality of apertures formed therein; and a plurality of baking subunits, wherein each baking subunit further includes a concave baking surface of a predetermined size, wherein the end portions of each concave baking surface are solid and closed and wherein the middle portion of each concave baking surface further includes a plurality of perforations formed therein, and wherein each baking subunit is adapted to be disposed within one of the apertures formed in the frame.

8 Claims, 5 Drawing Sheets

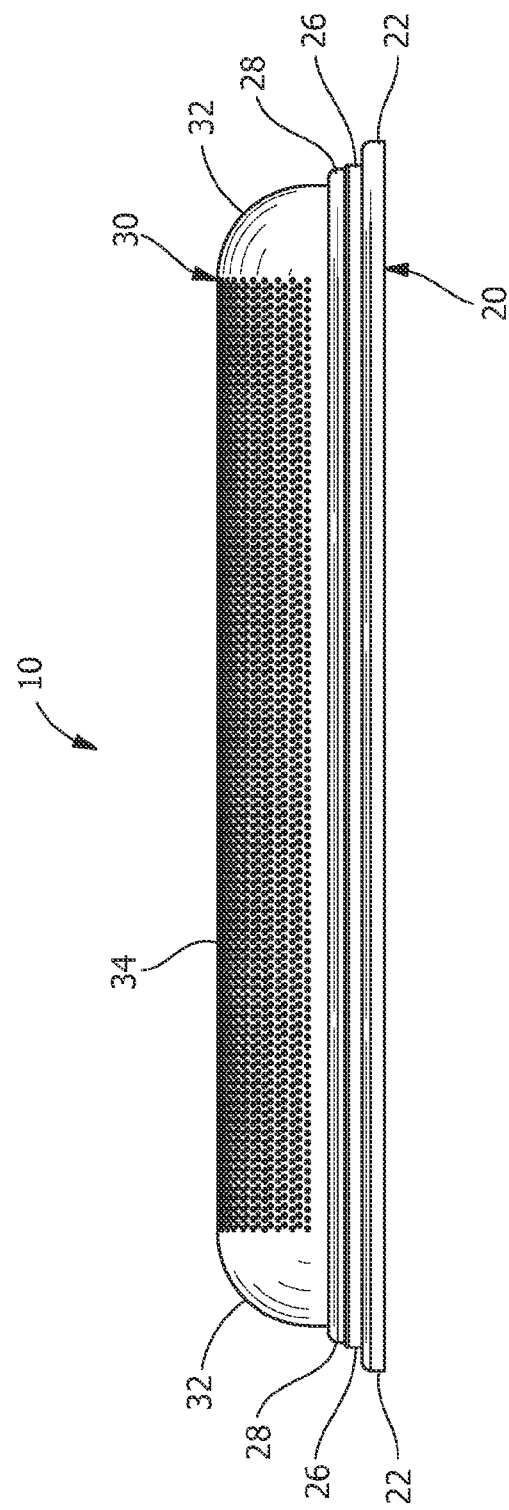

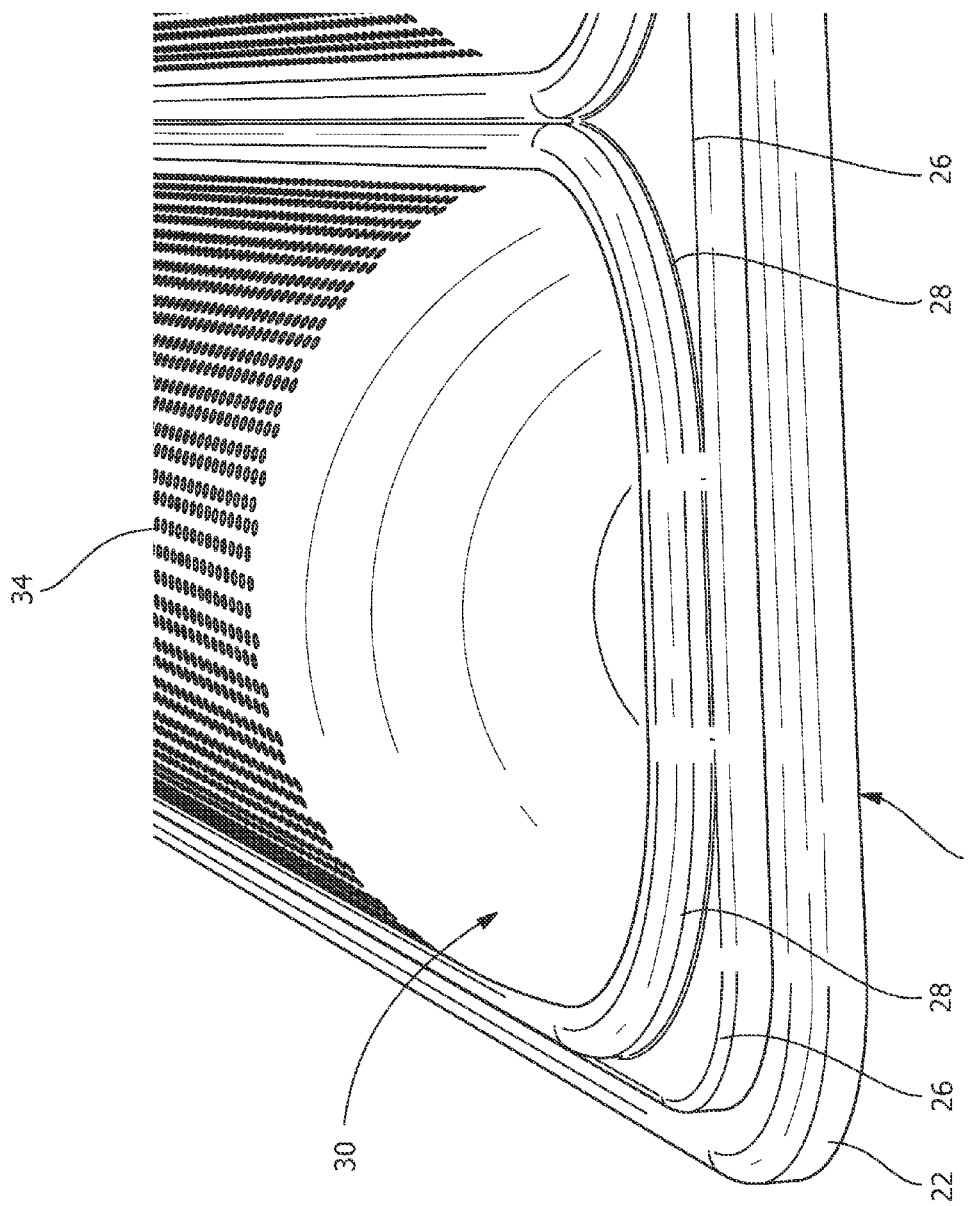

INDUSTRIAL BAGUETTE TRAY

BACKGROUND OF THE INVENTION

The described invention relates in general to pans and trays for use in industrial and commercial baking applications, and more specifically to an industrial baking tray for use in making baguettes, crusty rolls and the like, wherein the size and shape of the final baked products are predetermined by the size and shape of baking subunits having specific physical characteristics.

Certain types of baked products such as crusty rolls, baguettes, and the like are required, or at least expected, to have a proper crust formed thereon. Formation of this crust typically involves the use of baking trays that include perforated baking cavities. Manufacturing baking trays or pans that include perforated baking cavities introduces certain technical challenges with regard to formation and currently available designs include either open ends (i.e., flutes running unobstructed through the width or length) or closed ends that are formed by adding a flat bar at the end of the flutes. Significantly, the open-end design does not adequately control the overall length of the baked product and the closed-end design is known to be unsanitary and difficult to clean. Furthermore, neither known design meets NSF standards for bakery equipment sanitation. NSF International is a global independent public health and environmental organization that provides standards development, product certification, testing, auditing, education and risk management services for public health and the environment. NSF uses the terms "certified" or "listed" in connection with a product, good, component, system, material, compound or ingredient. A product that is certified or listed means that NSF: (i) reviewed the product, most often through a sampling of the product; (ii) determined at the time of the review that the product complied with the relevant NSF consensus standard and/or protocol; and (3) conducted or will conduct periodic audits to review whether the product continues to comply with the standard. After NSF certifies a product, the manufacturer of the product may use the NSF Mark on or in connection with the sale, use or distribution of that product. The NSF Mark conveys that an independent, third-party organization (NSF) has determined that the product complies with the relevant standard. Thus, there is an ongoing need for an industrial baking tray that effectively controls the overall length of a baked product and that meets NSF standards for bakery equipment sanitation.

SUMMARY OF THE INVENTION

The following provides a summary of certain exemplary embodiments of the present invention. This summary is not an extensive overview and is not intended to identify key or critical aspects or elements of the present invention or to delineate its scope.

In accordance with one aspect of the present invention, a first baking tray is provided. This baking tray includes a frame having a plurality of apertures formed therein; and a plurality of baking subunits, wherein each baking subunit further includes a concave baking surface of a predetermined size, wherein the end portions of each concave baking surface are solid and closed and wherein the middle portion of each concave baking surface further includes a plurality of perforations formed therein, and wherein each baking subunit is adapted to be disposed within one of the apertures formed in the frame.

In accordance with another aspect of the present invention, a second baking tray is provided. This baking tray includes a frame, wherein the frame further includes a plurality of apertures formed therein, and wherein each aperture is surrounded by a channel formed in the frame; and a plurality of baking subunits, wherein each baking subunit further includes a concave baking surface of a predetermined size, wherein the upper portion of each concave baking surface is surrounded by a flattened rim, wherein the end portions of each concave baking surface are solid and closed and wherein the middle portion of each concave baking surface further includes a plurality of perforations formed therein; wherein each baking subunit is adapted to be disposed within one of the apertures formed in the frame; wherein each baking subunit is affixed to the frame by placing the flattened rim surrounding the concave baking surface into the channel formed in the frame and forming a permanent bond therebetween, and wherein the area of each permanent bond is substantially contour-free.

In yet another aspect of this invention, a third baking tray is provided. This baking tray includes a frame, wherein the frame further includes a plurality of apertures formed therein, and wherein each aperture is surrounded by a channel formed in the frame; and a plurality of baking subunits; wherein each baking subunit further includes a concave baking surface of a predetermined size, wherein the upper portion of each concave baking surface is surrounded by a flattened rim, wherein the end portions of each concave baking surface are solid and closed and wherein the middle portion of each concave baking surface further includes a plurality of perforations formed therein; wherein each baking subunit is adapted to be disposed within one of the apertures formed in the frame; wherein each baking subunit is affixed to the frame by placing the flattened rim surrounding the concave baking surface into the channel formed in the frame and forming a permanent bond therebetween, and wherein the area of each permanent bond is substantially contour-free; and wherein the geometry of each baking subunit is operative to control the length of a product baked in the tray.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

DESCRIPTION OF THE DRAWINGS

The accompanying drawings, which are incorporated into and form a part of the specification, schematically illustrate one or more exemplary embodiments of the invention and, together with the general description given above and detailed description given below, serve to explain the principles of the invention, and wherein:

FIG. 4 is an end view baguette tray of FIG. 1; and

FIG. 5 is a side, perspective view of the baguette tray of FIG. 1 showing the end portion of one of the baking subunits.

DESCRIPTION OF THE INVENTION

Figure 1:
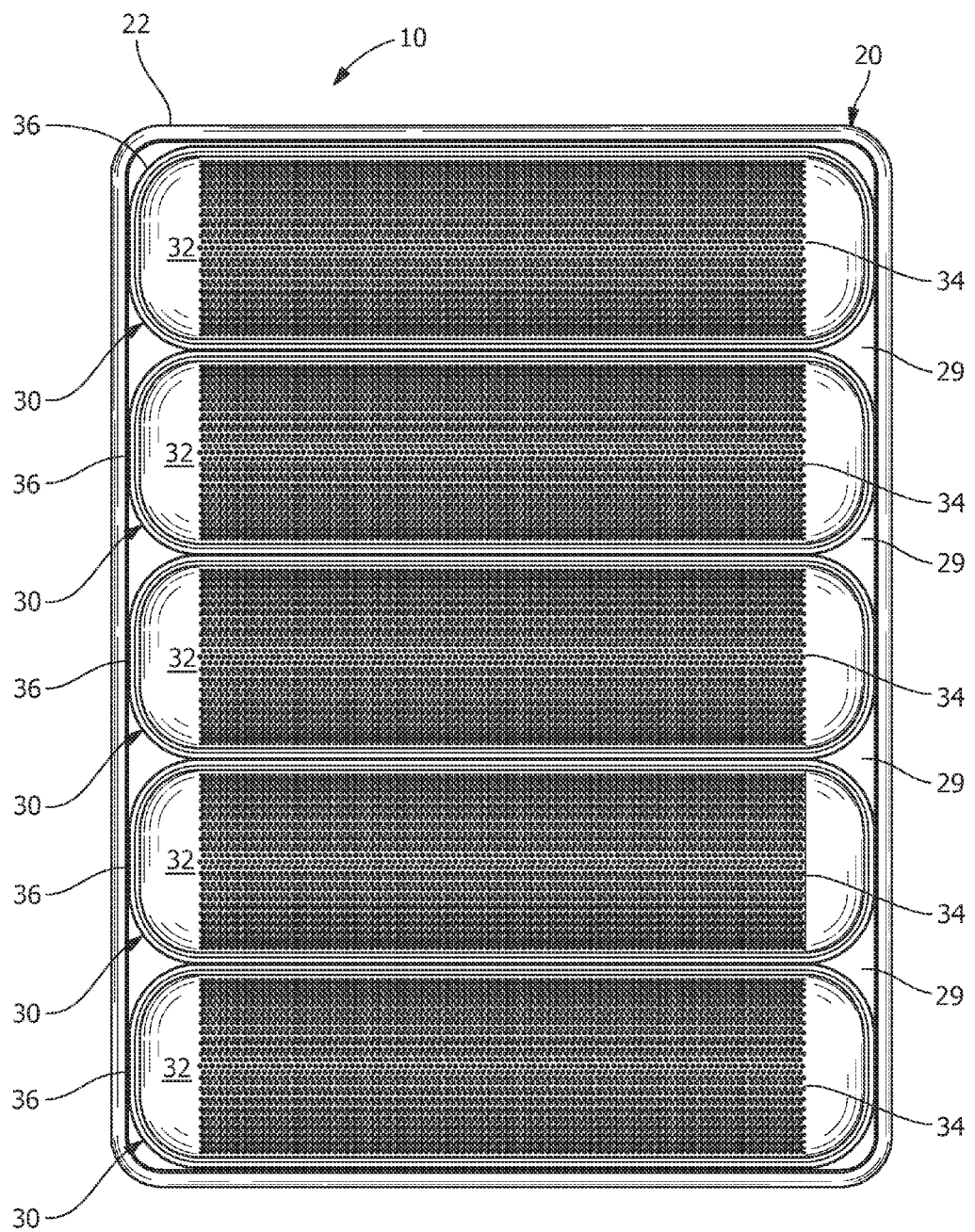
FIG. 1 is a top view of an industrial baguette tray in accordance with an exemplary embodiment of the present invention.
Figure 2:
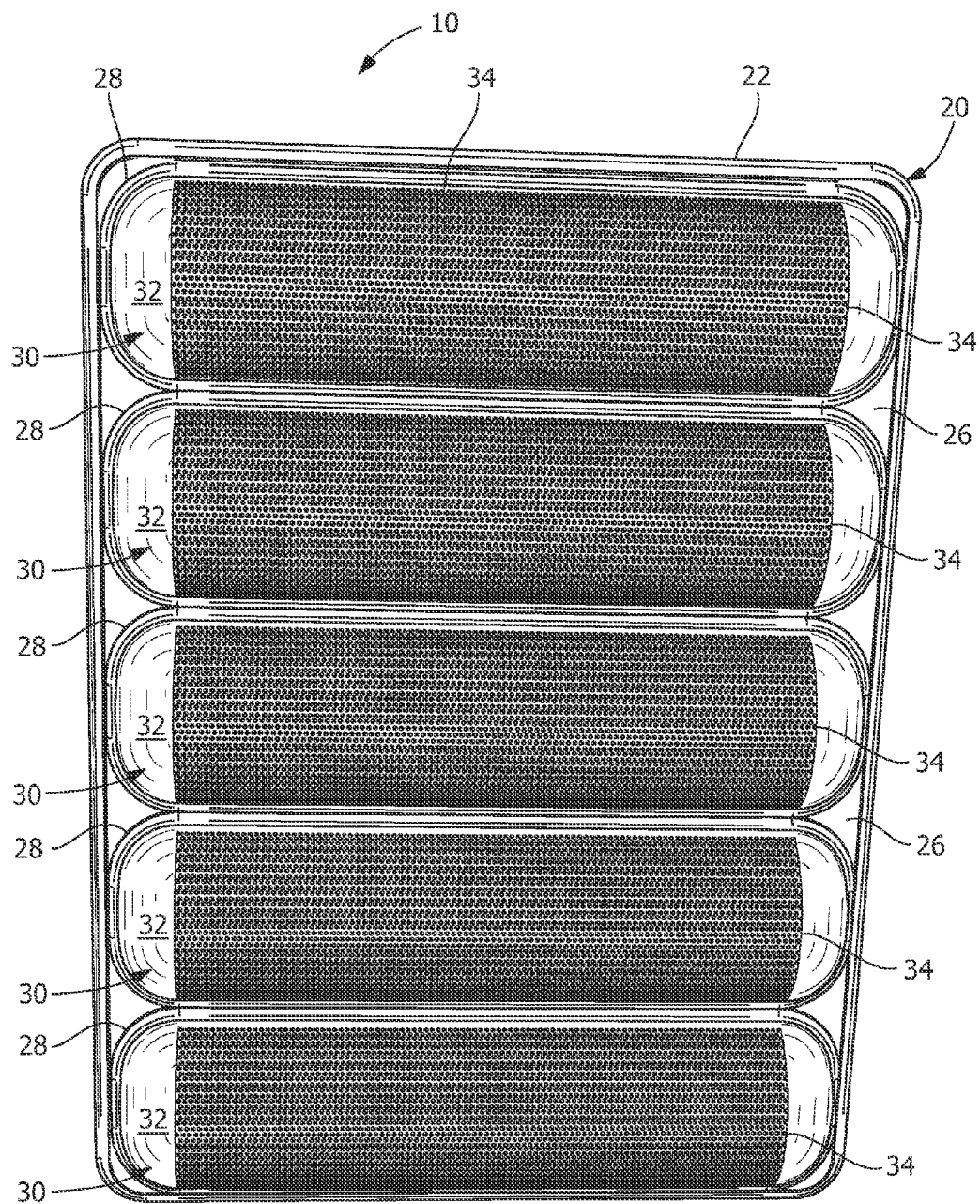
FIG. 2 is a bottom perspective view of the baguette tray of FIG. 1.
Figure 3:
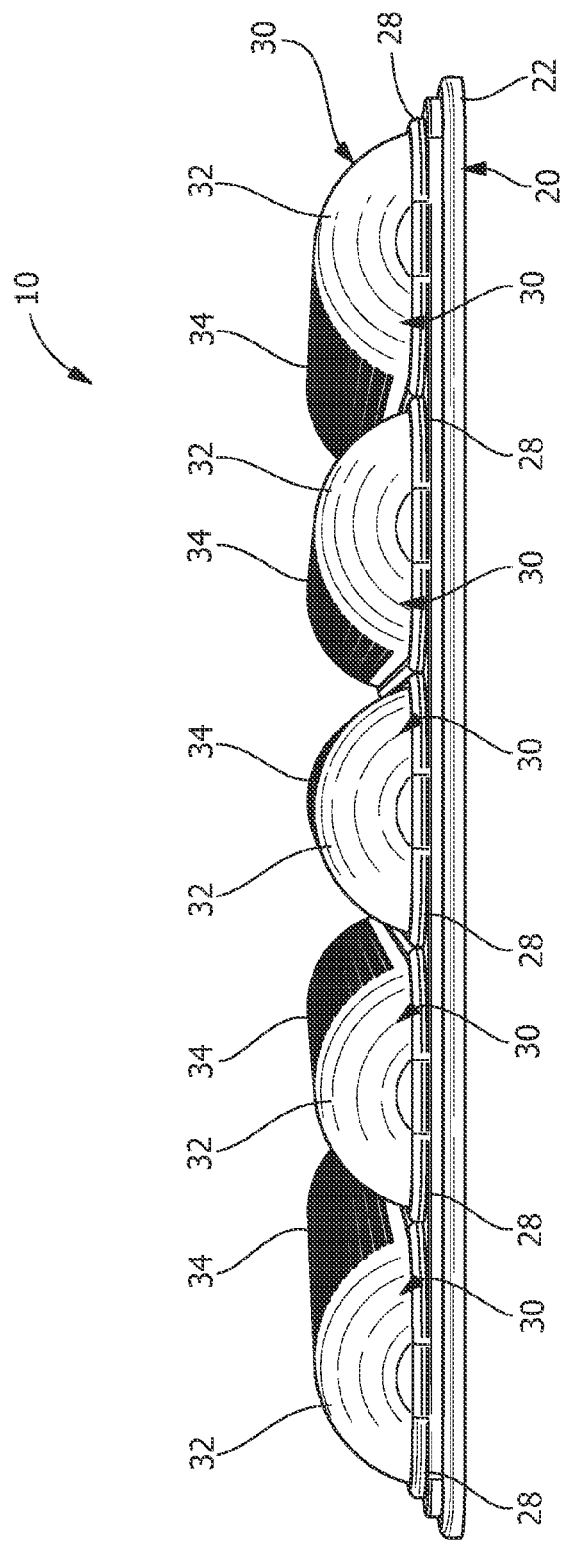
FIG. 3 is a side view of the baguette tray of FIG. 1.

Exemplary embodiments of the present invention are now described with reference to the Figures. Although the following detailed description contains many specifics for purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

As previously stated, the present invention relates generally pans and trays for use in industrial and commercial baking applications, and more specifically to an industrial baking tray for use in making baguettes, crusty rolls and the like, wherein the size and shape of the final baked products are predetermined by the size and shape of baking subunits having specific physical (i.e., geometric) characteristics. With reference now to the Figures, FIGS. 1-5 provide various views of an exemplary embodiment of baguette tray 10, which includes frame 20 and a plurality of unique baking subunits 30.

In the exemplary embodiment shown in the Figures, frame 20 is rectangular in shape and is manufactured or fabricated (e.g., stamped) from a single piece of aluminum or other suitable metal or durable material. Lip 22 is formed around the upper perimeter of frame 20 and encloses a band of steel, which is typically rectangular in cross section, or other metal or suitable material for providing structural support to tray 10. Lip 22 is turned outward and downward and is sealed tightly against the outer surface of frame 20 such that very little or no open volume is present between the lip and the frame. This complete or substantially complete lack of open volume provides for a highly sanitary tray. Upper portion 24 of frame 20 (see FIG. 1) defines a plurality of openings or apertures, as do middle frame portion 26 and lower frame portion 28 (see FIG. 5). A recessed space, area, or channel, not shown in the Figures, surrounds the upper portion (i.e., top side of tray 10) of each opening/aperture formed in frame 20.

In the exemplary embodiment shown in the Figures, each baking subunit 30 is an elongated, semi-tubular structure that has been manufactured or fabricated (e.g., stamped) from a single piece of aluminum or other suitable metal or durable material that provides a concave baking surface. This concave baking surface further includes two end portions 32 that in some embodiments are solid metal and closed and a center portion 34 that is that is perforated (see FIGS. 1 and 2). In other embodiments, the entire length of the concave baking surface is perforated or various patterns of perforated areas are formed in the baking surface. No folds or seams are present in the baking zone and the overall design of the baking subunits provides a high degree of control over the size and shape of the final baked product, thereby resulting in precise and repeatable baguettes or similar products. Additionally, the upper surface of baguette tray 10 may be covered with one or more non-stick coating layers that enhance the releasability of baked products from the tray. For example, some embodiments of this invention include a coating of Durashield® (American Pan Company), which is an NSF certified, USFDA (U.S. Food and Drug Administration) compliant food release coating specifically designed for commercial baking applications.

As shown in FIG. 1, a flattened lip portion 36 surrounds the upper edge of each baking subunit 36. When baguette tray 10 is assembled, flattened lip portion 36 of each baking subunit 30 is lock-seamed, welded or otherwise permanently attached to a corresponding space, area, or channel (not shown) formed in frame 20. When baking subunits 30 are installed in this manner, there is little or no appreciable open volume between the baking subunits and the frame, which provides for a very sanitary, easy to clean pan. Likewise, as best shown in FIG. 5, lower frame portion 28 includes a rim-like structure that encircles each baking subunit 30 and that is positioned in close proximity to the lower (i.e., bottom) surface of each baking subunit. This further reduces or eliminates any appreciable open volume between frame 20 and baking subunits 30. The design of the present invention is consistent with NSF, BISSC (Baking Industry Sanitation Standards Committee) and FDA certification requirements and baguette tray 10 is designed to work with industry standard rack sizes. Baguette tray 10 is also designed to stack and inter-nest easily with other trays in a manner that protects the baking surfaces thereof.

In one embodiment of this invention, baguette tray 10, is manufactured from a single piece of aluminum or other suitable metal that includes a frame component and baking subunits formed from a single, deep drawn metal. In this version of the invention, the baking subunits would still include closed ends and a plurality of perforations in various configurations, but lock seams or other weld joints are not be present or necessary.

While the present invention has been illustrated by the description of exemplary embodiments thereof, and while the embodiments have been described in certain detail, it is not the intention of the Applicant to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the applicant's general inventive concept.

What is claimed:

1. A baking tray, comprising;
    (a) a frame,
        (i) wherein the frame is fabricated from a single piece of material,
        (ii) wherein the frame includes an upper portion and a lower portion,
        (iii) wherein the frame defines a plurality of individual apertures formed therein,
        (iv) wherein the shape of each of the individual apertures corresponds to the shape of an individual baking unit,
        (v) wherein each of the individual apertures is surrounded by a recessed channel formed in the upper portion of the frame,
        (vi) wherein each of the individual apertures is surrounded by a rim-like structure formed in the lower portion of the frame, and
        (vii) wherein each of the rim-like structures is adapted to encircle an individual baking subunit;
    (b) a plurality of individual baking subunits;
        (i) wherein each baking subunit further includes a concave baking surface of a predetermined size,
        (ii) wherein an upper portion of each concave baking surface is surrounded by a flattened rim,
        (iii) wherein end portions of each concave baking surface are closed,
        (iv) wherein a middle portion of each concave baking surface further includes a plurality of perforations formed therein; and
        (v) wherein each baking subunit is disposed within one of the apertures formed in the frame; and
    (c) a plurality of permanent bond formed between the individual baking subunits and the frame, wherein each permanent bond further includes:

(i) a permanent bond formed between each recessed channel in the upper portion of the frame and the framed the flattened rim of each individual baking subunit, (ii) wherein, the permanent bond formed between each recessed channel in the upper portion of the frame and the flattened rim of each individual baking subunit, in combination with the rim-like structure formed in the lower portion of the frame and surrounding each individual aperture, reduces or eliminates any open volume between the frame and each individual baking subunit.

2. The baking tray of claim 1, wherein each permanent bond formed between the frame and an individual baking subunit further includes a lock seam.

3. The baking tray of claim 1, wherein the frame further comprises a lip formed around an upper perimeter thereof, and wherein the lip is folded outward and downward against an outer surface of the frame to minimize any open volume between the lip and the outer surface of the frame.

4. The baking tray of claim 3, wherein the lip encloses a metal band that encircles a top perimeter edge of the frame.

5. The baking tray of claim 1, wherein a top surface of the tray is covered with at least one non-stick coating layer, and wherein the at least one non stick coating enhances the releasability of a baked product from the tray.

6. The baking tray of claim 1, wherein the geometry of each baking subunit controls the length of a product baked in the tray.

7. The baking tray of claim 1, wherein the end portions of each concave baking surface further include a plurality of perforations formed therein.

8. The baking tray of claim 1, wherein the frame and the baking subunits are formed from a single piece of material.

\* \* \* \* \*